United States Patent
Lee et al.

(10) Patent No.: US 9,002,199 B2
(45) Date of Patent: Apr. 7, 2015

(54) APPARATUS AND METHOD FOR MONITORING OPTICAL LINE

(71) Applicant: Electronics and Telecommunications Research Institute, Daejeon (KR)

(72) Inventors: Mun Seob Lee, Daejeon (KR); Dong Soo Lee, Gwangju (KR); Geun Yong Kim, Gyeonggi-do (KR); Hark Yoo, Gwangju (KR); Sung Chang Kim, Gwangju (KR); Young Suk Lee, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 148 days.

(21) Appl. No.: 13/745,144

(22) Filed: Jan. 18, 2013

(65) Prior Publication Data

US 2013/0188947 A1 Jul. 25, 2013

(30) Foreign Application Priority Data

Jan. 20, 2012 (KR) .......................... 10-2012-0006783

(51) Int. Cl.
*H04B 10/08* (2006.01)
*H04B 10/071* (2013.01)
*H04B 10/00* (2013.01)

(52) U.S. Cl.
CPC .................................. *H04B 10/071* (2013.01)

(58) Field of Classification Search
CPC ....................................................... H04B 10/071
USPC ............................ 398/98, 99, 100, 17, 21, 22
See application file for complete search history.

(56) References Cited

U.S. PATENT DOCUMENTS

| 2007/0122157 A1* | 5/2007 | Vandewege et al. .......... 398/141 |
| 2009/0109972 A1* | 4/2009 | Chen ............................ 370/390 |
| 2011/0013904 A1 | 1/2011 | Khermosh et al. |

OTHER PUBLICATIONS

Schmuck, H. et al., "Embedded OTDR techniques for cost-efficient fibre monitoring in optical access networks," ECOC 2006, European Conference on Optical Communications, pp. 1-2 (2006).

* cited by examiner

*Primary Examiner* — Daniel Dobson
(74) *Attorney, Agent, or Firm* — Nelson Mullins Riley & Scarborough LLP; Anthony A. Laurentano, Esq.; Lewis Lee, Esq.

(57) ABSTRACT

An apparatus and method for monitoring an optical line is provided. The optical line monitoring apparatus may include a comparison unit to extract first identification information about an optical network terminal (ONT) from reflected data that is reflected and received from the optical line, and to compare the extracted first identification information to predetermined second identification information about the ONT, and a processor to analyze a state of the optical line using the reflected data when the first identification information is identical to the second identification information.

10 Claims, 6 Drawing Sheets

APPARATUS AND METHOD FOR MONITORING OPTICAL LINE

CROSS-REFERENCE TO RELATED APPLICATION

This application claims the benefit of Korean Patent Application No. 10-2012-0006783, filed on Jan. 20, 2012, in the Korean Intellectual Property Office, the disclosure of which is incorporated herein by reference.

BACKGROUND

1. Field of the Invention

The present invention relates to a technology for supporting an upstream communication and simultaneously enabling easy analysis of an optical signal using identification information about an optical network terminal (ONT) by transmitting an upstream optical signal including the identification information.

2. Description of the Related Art

A recent large-scale multimedia service or Internal Protocol television (IPTV) service may provide data to a subscriber end through an optical line in an optical subscriber network. Among optical subscriber networks, a passive optical network (PON) including a passive device that uses little power supply halfway is widely used due to easy maintenance and economic feasibility.

Monitoring a state of a network is necessary for reliable management of a PON. For example, since a cut of an optical fiber cable in the network, deterioration, a structure change of a connector, and the like may cause communication problems between an optical line terminal (OLT) and an optical network terminal (ONT) connected through the network, monitoring changes in the network is required.

A conventional optical time domain reflector (OTDR), an apparatus for monitoring a state of a network, may analyze a state of an optical line in the network, for example, an error location and characteristics. That is, the OTDR may analyze the state of the optical line, by transmitting an optical signal, for example, an optical pulse, having a predetermined wavelength to the optical line, and measuring an optical power of the pulse that is backscattered due to Rayleigh scattering, Fresnel reflection, and the like. The conventional OTDR may be disposed, for example, in an ONT to analyze the state of the optical line in the network. Here, since the OTDR may require an optical signal having an optical wavelength distinct from optical wavelengths of an upstream optical signal and a downstream optical signal, for example, an optical signal in a 1,600 nanometer (nm) band, a cost of the equipment may increase.

Accordingly, there was suggested a low-cost OTDR that may reduce such a cost of equipment, through common use of an upstream optical signal of an ONT as an optical signal for monitoring. That is, when an upstream optical signal is not transmitted by an ONT connected to an OLT, the low-cost OTDR may transmit, to an optical line, an optical signal for transmitting data as an optical signal for monitoring, and may analyze discontinuity of the optical line using reflected pulse lights, thereby verifying a state of the optical line.

However, such a low-cost OTDR may fail to verify the state of the optical line when an upstream communication is performed such that an upstream optical signal is transmitted. Accordingly, when an unexpected error, for example, a fiber-cut or fiber-bending, occurs, the low-cost OTDR may fail to detect the error in real time.

In addition, when an upstream optical signal transmitted from another ONT is reflected due to discontinuity, that is, an error, occurring in the optical line, reflected pulse lights may be mixed to be indistinguishable from one another. In this case, the low-cost OTDR may face a difficulty in analyzing the state of the optical line accurately.

SUMMARY

An aspect of the present invention provides an apparatus and method that may support an upstream communication for an optical network terminal (ONT) and simultaneously, enable easy analysis of an optical signal using identification information about the ONT, by transmitting an upstream optical signal including the identification information.

According to an aspect of the present invention, there is provided an apparatus for monitoring an optical line, the apparatus including a comparison unit to extract first identification information about an ONT from reflected data that is reflected and received from the optical line, and to compare the extracted first identification information to predetermined second identification information about the ONT, and a processor to analyze a state of the optical line using the reflected data when the first identification information is identical to the second identification information.

According to another aspect of the present invention, there is provided a method of monitoring an optical line, the method including extracting first identification information about an ONT from reflected data that is reflected and received from the optical line, and comparing the extracted first identification information to predetermined second identification information about the ONT, and analyzing a state of the optical line using the reflected data when the first identification information is identical to the second identification information.

According to example embodiments, by transmitting an upstream optical signal including identification information about an ONT, an upstream communication for the ONT may be supported and simultaneously an optical signal may be easily analyzed using the identification information.

That is, an apparatus for monitoring an optical line may extract first identification information about an ONT from reflected data that is reflected from an optical line, and may compare the extracted first identification information to predetermined second information about the ONT. When the first identification information is identical to the second identification information as a result of the comparing, the optical line monitoring apparatus may limit interference of reflected data associated with another ONT by analyzing a state of the optical line using the reflected data that is reflected from the optical line, thereby analyzing the state of the optical line more accurately.

In addition, the optical line monitoring apparatus may verify the state of the optical line although an upstream and downstream communication is performed. Accordingly, when an unexpected error occurs, the optical line monitoring apparatus may detect the error in real time.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
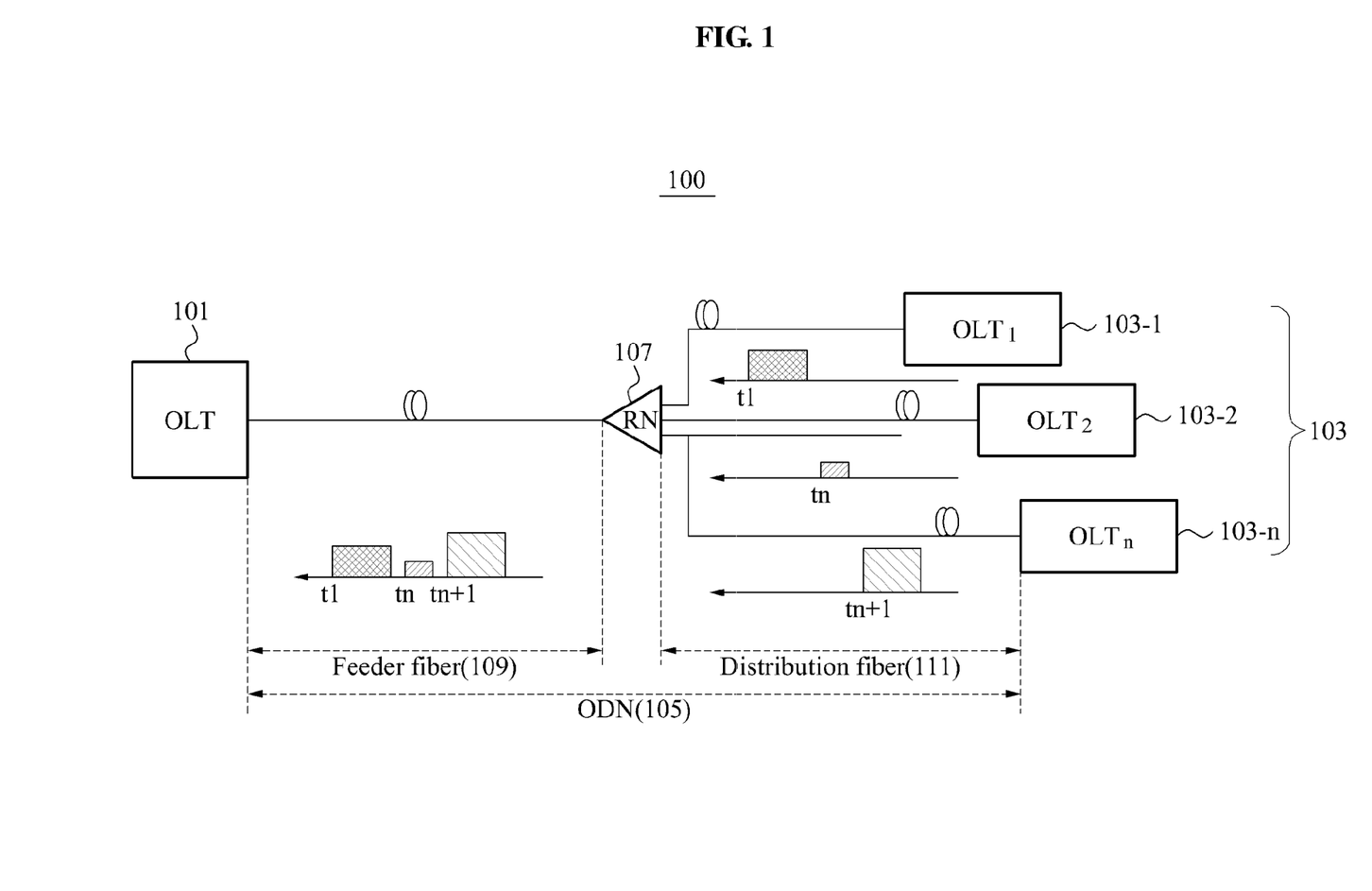
FIG. 1 is a diagram illustrating an optical subscriber network system according to an embodiment of the present invention.

FIG. 1 is a diagram illustrating an optical subscriber network system 100 according to an embodiment of the present invention.

Referring to FIG. 1, the optical subscriber network system 100 may include an optical line terminal (OLT) 101, and an optical network terminal (ONT) 103. Here, the optical subscriber network system 100 may perform communication, for example, based on a time-division multiplexing passive optical network (TDM-PON).

The OLT 101 may be disposed, for example, in a base station to provide services by transmitting a downstream optical signal. Here, the downstream optical signal may have a wavelength corresponding to, for example, 1577 nanometers (nm), or 1550 nm.

The OLT 101 may be connected to the ONT 103 through an optical distribution network (ODN) 105. Here, the ODN 105 may include a remote node (RN) 107 including a passive device, for example, a splitter, a feeder fiber 109 corresponding to an optical transmission line between the OLT 101 and the RN 107, and a distribution fiber 111 corresponding to an optical transmission line between the RN 107 and the ONT 103.

Here, the RN 107 may receive the downstream optical signal from the OLT 101, and may transmit the received downstream optical signal to the ONT 103.

In addition, the RN 107 may receive, from n ONTs 103, n upstream optical signals including predetermined identification information about the ONT 103, respectively. The RN 107 may combine the n upstream optical signals, and may transmit a resulting upstream optical signal to the OLT 101. Here, each of the n upstream optical signals may have a wavelength corresponding to, for example, 1310 nm, or 1270 nm.

The ONT 103 may receive the downstream optical signal from the RN 107, and may process data, in the received downstream optical signal, allocated to the ONT 103.

The ONT 103 may include an optical line monitoring apparatus (not shown). The optical line monitoring apparatus may generate an upstream optical signal including predetermined identification information about the ONT 103, and may transmit the generated upstream optical signal to the RN 107 based on a time-slot provided by the OLT 101.

When an error occurs in an optical line, for example, the feeder fiber 109, or the distribution fiber 111, the ONT 103 may analyze a state of the optical line, using an upstream optical signal received when the transmitted upstream optical signal is reflected, that is, fed back. Here, a first ONT 103-1 may extract first identification information about the first ONT 103-1 from reflected data that is reflected from the optical line, and may compare the extracted first identification information to predetermined second identification information about the first ONT 103-1. When the first identification information is identical to the second identification information as a result of the comparing, the first ONT 103-1 may limit interference of reflected data associated with another ONT, for example, a second ONT 103-2, by analyzing the state of the optical line using the reflected data that is reflected from the optical line, thereby analyzing the state of the optical line more accurately.

Figure 2:
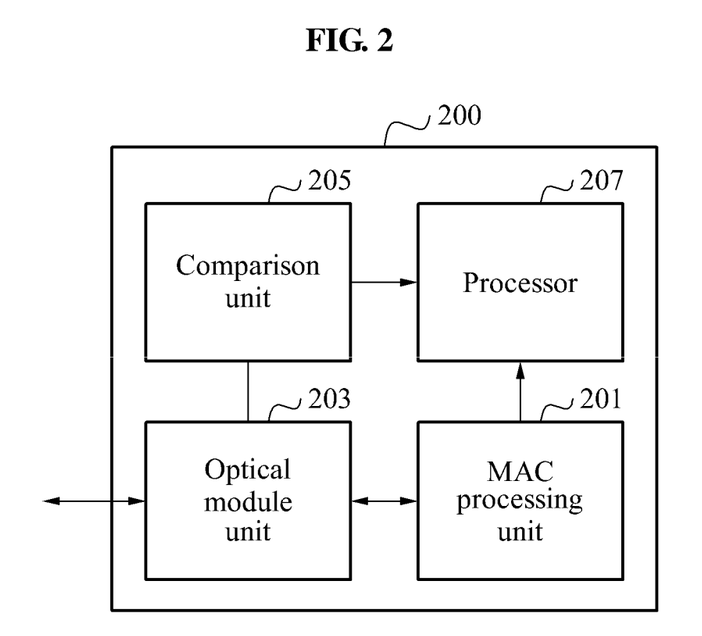
FIG. 2 is a diagram illustrating an optical line monitoring apparatus according to an embodiment of the present invention.

FIG. 2 is a diagram illustrating an optical line monitoring apparatus 200 according to an embodiment of the present invention. Here, the optical line monitoring apparatus 200 may be included in or connected to an ONT.

Referring to FIG. 2, the optical line monitoring apparatus 200 may include a media access control (MAC) processing unit 201, an optical module unit 203, a comparison unit 205, and a processor 207.

The MAC processing unit 201 may generate upstream data including predetermined second identification information about the ONT, and may provide the generated second identification information to the comparison unit 205. Here, the predetermined second identification information about the ONT may correspond to identification information of an ONT associated with the optical line monitoring apparatus 200, for example, an ONT in which the optical line monitoring apparatus 200 is included, or to which the optical line monitoring apparatus 200 is connected.

In particular, the MAC processing unit 201 may generate the upstream data by incorporating, into the upstream data, the predetermined second identification information about the ONT, a delimiter indicating a start of a frame of the upstream data, and raw data desired to be transmitted.

In addition, the MAC processing unit 201 may generate transmission time information regarding a point in time at which an upstream optical signal is transmitted to an OLT by the optical module unit 203, and may provide the generated transmission time information to the processor 207.

The optical module unit 203 may convert the upstream data generated by the MAC processing unit 201 into an upstream optical signal, and may transmit the upstream optical signal to the OLT through an optical line. In addition, the optical module unit 203 may receive the upstream optical signal reflected from the optical line, convert the received upstream optical signal into reflected data of an electrical signal, and provide the converted reflected data to the comparison unit 205.

The comparison unit 205 may extract first identification information about the ONT from the reflected data that is reflected and received from the optical line, and compare the extracted first identification information to predetermined second identification information about the ONT. When the first identification information is identical to the second identification information as a result of the comparing, the comparison unit 205 may transmit the reflected data to the processor 207.

In addition, when a plurality of pieces of first identification information is extracted from the reflected data, the comparison unit 205 may extract, from the reflected data, first data corresponding to first identification information identical to the second identification information, and provide the extracted first data to the processor 207, thereby distinguishing second data associated with another ONT, other than the ONT associated with the optical line monitoring apparatus 200, or an optical line connected to the other ONT, and limiting provision of the second data to the processor 207.

When the first identification information is identical to the second identification information, the processor 207 may analyze a state of the optical line, using the reflected data that is received from the comparison unit 205. The processor 207 may verify, as the state of the optical line, whether an error occurs, that is, whether discontinuity of the optical line occurs due to a fiber-cut, bending, a connector, splicing, and the like, or a point of the optical line at which an error occurs. Here, the processor 207 may generate reception time information regarding a point in time at which an upstream optical signal is received by the optical module unit 203, and may analyze the point of the optical line at which the error occurs, as the state of the optical line, using the generated reception time information, and transmission time information regarding a point in time at which the upstream optical signal is transmitted to the OLT. Here, the transmission time information may be provided by the MAC processing unit 201.

When a plurality of pieces of first identification information is extracted from the reflected data by the comparison unit 205, the processor 207 may receive, from the comparison unit 205, first data extracted from the reflected data, and corresponding to first identification information identical to the second identification information, and may analyze the state of the optical line using the received first data. That is, the processor 207 may analyze the state of the optical line, using only the first data, excluding the second data associated with the other ONT, or the optical line connected to the other ONT from among the reflected data, thereby accurately analyzing the state of the optical line connected to the ONT associated with the optical line monitoring apparatus 200, other than the optical line connected to the other ONT.

The processor 207 may display the state of the optical line through an internal display unit (not shown), or may transmit the state of the optical line to a network management apparatus (not shown), thereby enabling a user to verify the state of the optical line readily, and to take an appropriate action promptly.

Figure 3:
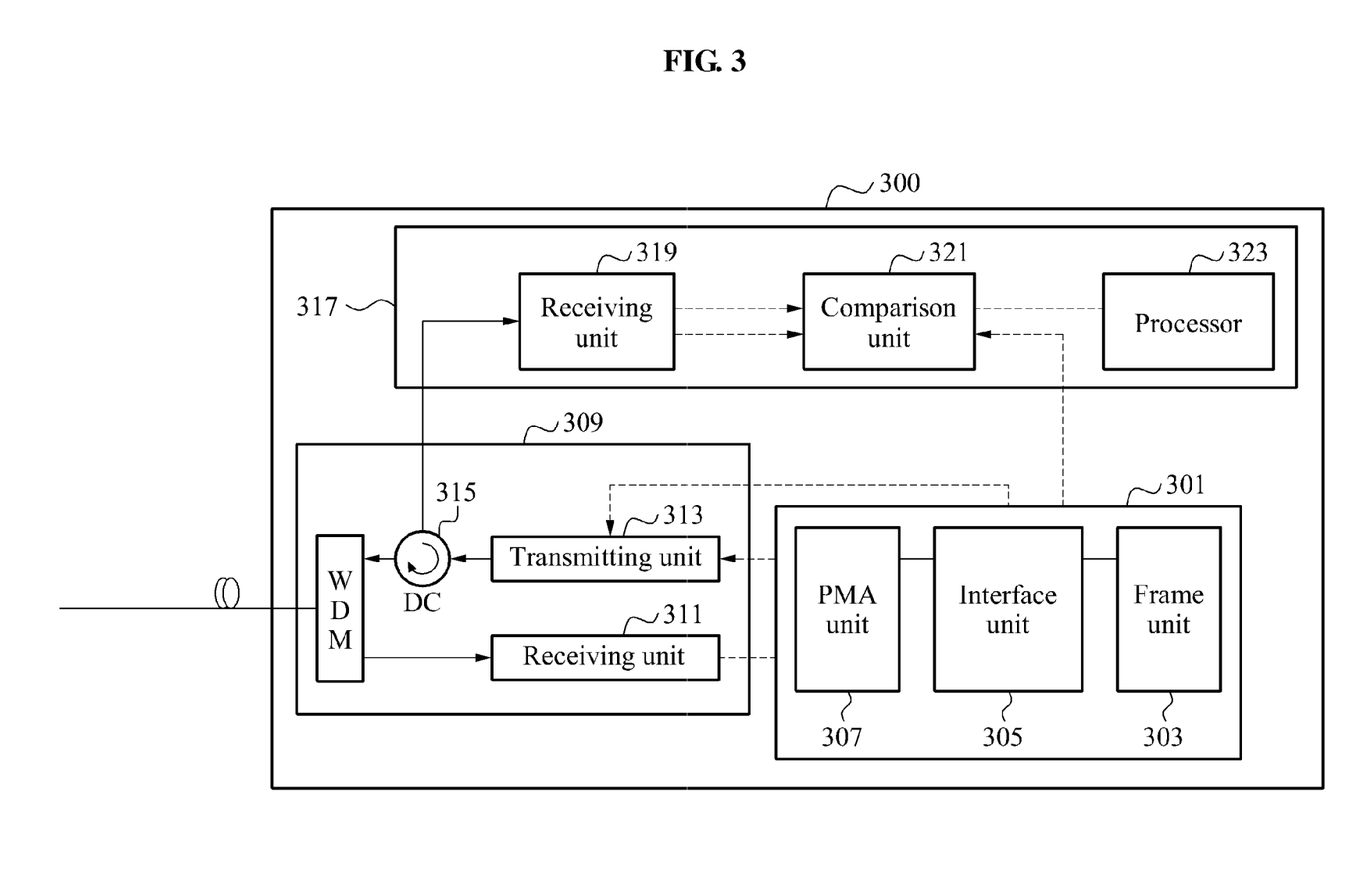
FIG. 3 is a diagram illustrating a configuration of an optical line monitoring apparatus according to an embodiment of the present invention.

FIG. 3 is a diagram illustrating a configuration of an optical line monitoring apparatus 300 according to an embodiment of the present invention.

Referring to FIG. 3, the optical line monitoring apparatus 300 may include a MAC processing unit 301, an optical module unit 309, and a monitoring unit 317.

The MAC processing unit 301 may process upstream data or downstream data, and may allocate a time-slot and a bandwidth to an upstream optical signal. In addition, the MAC processing unit 301 may generate transmission time information regarding a point in time at which the upstream optical signal is transmitted, and may transmit the generated transmission time information to the monitoring unit 317.

The MAC processing unit 301 may include a frame unit 303, an interface unit 305, and a physical medium attachment (PMA) unit 307.

The frame unit 303 may process framing of the upstream data or framing of the downstream data. In this instance, the frame unit 303 may generate upstream data including predetermined second identification information about an ONT.

The interface unit 305 may transmit the upstream data based on the time-slot allocated by an OLT.

The PMA unit 307 may multiplex or demultiplex Bit-rate data, electrically.

The optical module unit 309 may include a receiving unit 311 to receive a downstream optical signal entering through a single optical transmission line, and a transmitting unit 313 to transmit a burst mode upstream optical signal.

In addition, the optical module unit 309 may include a directional coupler (DC) 315 or a circulator (not shown) to provide data to the monitoring unit 317. The optical module unit 309 may receive an upstream optical signal that is fed back when a transmitted upstream optical signal is reflected from the optical line, convert the received upstream optical signal into reflected data of an electrical signal, and provide the converted reflected data to the monitoring unit 317.

The monitoring unit 317 may analyze the reflected data received from the optical module unit 309.

The monitoring unit 317 may include a receiving unit 319, a comparison unit 321, and a processor 323.

The receiving unit 319 may receive the reflected data from the optical module unit 309, and may transfer the received reflected data to the comparison unit 321.

The comparison unit 321 may extract first identification information about the ONT from the reflected data, and may compare the extracted first identification information to the predetermined second identification information about the ONT. When the first identification information is identical to the second identification information as a result of the comparison, the comparison unit 321 may transmit the reflected data to the processor 323.

When the first identification information is identical to the second identification information, the processor 323 may analyze the reflected data received from the comparison unit 321, thereby analyzing a state of the optical line.

Figure 4:
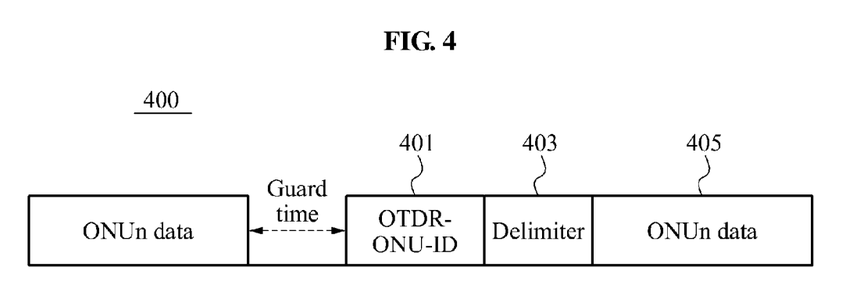
FIG. 4 is a diagram illustrating an upstream optical signal used in an optical line monitoring apparatus according to an embodiment of the present invention.

FIG. 4 is a diagram illustrating an upstream optical signal 400 used in an optical line monitoring apparatus according to an embodiment of the present invention.

Referring to FIG. 4, the upstream optical signal 400 may include predetermined identification information OTDR-ONU-ID 401 about an ONT, a delimiter 403 indicating a start of a frame, and raw data ONTn 405 desired to be transmitted by the ONT.

Figure 5:
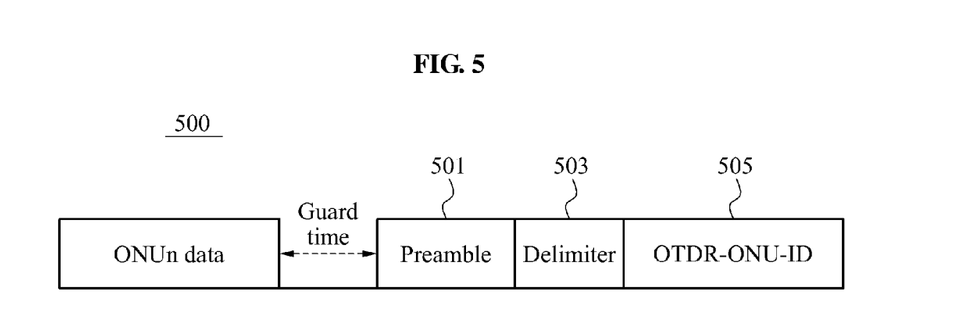
FIG. 5 is a diagram illustrating an upstream optical signal used in an optical line monitoring apparatus according to another embodiment of the present invention.

FIG. 5 is a diagram illustrating an upstream optical signal 500 used in an optical line monitoring apparatus according to another embodiment of the present invention.

Referring to FIG. 5, the upstream optical signal 500 may include a preamble 501, a delimiter 503 indicating a start of a frame, and predetermined identification information OTDR-ONU-ID 505 about an ONT. Here, the preamble 501 may correspond to a section to be used for clock and data recovery (CDR) and an optical module in an OLT, and may be discarded in an MAC block of the OLT, irrespective of data to be actually transmitted, for example, raw data.

Figure 6:
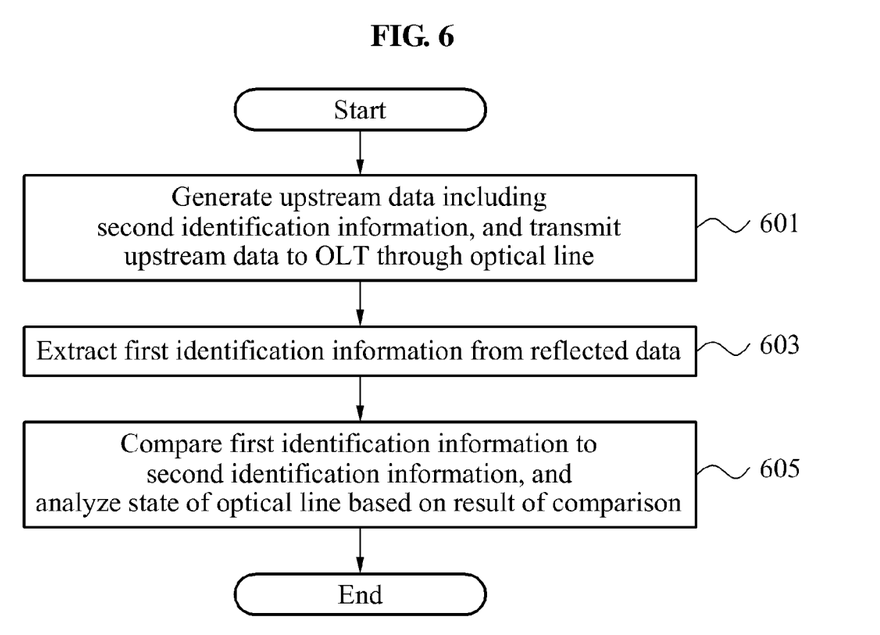
FIG. 6 is a flowchart illustrating an optical line monitoring method according to an embodiment of the present invention.

FIG. 6 is a flowchart illustrating an optical line monitoring method according to an embodiment of the present invention.

Referring to FIG. 6, in operation 601, an optical line monitoring apparatus may generate upstream data including predetermined second identification information about an ONT, convert the generated upstream data into an upstream optical signal, and transmit the upstream optical signal to an OLT through an optical line. In this instance, the optical line monitoring apparatus may generate the upstream data, by incorporating, into the upstream data, the predetermined second identification information about the ONT, a delimiter indicating a start of a frame of the upstream data, and raw data desired to be transmitted.

In operation 603, the optical line monitoring apparatus may receive reflected data that is reflected from the optical line, associated with the upstream data, and may extract first identification information about the ONT from the received reflected data. Here, the optical line monitoring apparatus may receive the upstream optical signal reflected from the optical line, and may convert the upstream optical signal into the reflected data of an electrical signal.

In operation 605, the optical line monitoring apparatus may compare the extracted first identification information to the predetermined second identification information about the ONT. When the first identification information is identical to the second identification information, the optical line monitoring apparatus may analyze a state of the optical line using the reflected data. Here, the optical line monitoring apparatus may analyze a point of the optical line at which an error occurs, as the state of the optical line, based on transmission time information regarding a point in time at which the converted upstream optical signal is transmitted to the OLT, and reception time information regarding a point in time at which the upstream optical signal is received.

When a plurality of pieces of first identification information is extracted from the reflected data, the optical line monitoring apparatus may extract, from the reflected data, first data corresponding to first identification information identical to the second identification information, and may analyze the state of the optical line using the extracted first data. That is, the optical line monitoring apparatus may analyze the state of the optical line, using only the first data, excluding the second data associated with another ONT, or an optical line connected to another ONT from among the reflected data, thereby accurately analyzing the state of the optical line connected to the ONT associated with the optical line monitoring apparatus, other than the optical line connected to the other ONT.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for monitoring an optical line, the apparatus comprising:
    a comparison unit to extract first identification information about an optical network terminal (ONT) from reflected data that is reflected and received from the optical line, and to compare the extracted first identification information to predetermined second identification information about the ONT; and
    a processor to analyze a state of the optical line using the reflected data when the first identification information is identical to the second identification information,
    wherein, when a plurality of pieces of the first identification information is extracted from the reflected data, the comparison unit extracts, from the reflected data, first data corresponding to the first identification information identical to the second identification information and provides the extracted first data to the processor, and the processor analyzes the state of the optical line using the provided first data.

2. The apparatus of claim 1, further comprising:
    a media access control (MAC) processing unit to generate upstream data including the predetermined second identification information about the ONT, and to provide the second identification information to the comparison unit; and
    an optical module unit to convert the upstream data into an upstream optical signal, and to transmit the upstream optical signal to an optical line terminal (OLT) through the optical line.

3. The apparatus of claim 2, wherein the MAC processing unit generates the upstream data by incorporating, into the upstream data, the predetermined second identification information about the ONT, a delimiter indicating a start of a frame of the upstream data, and raw data desired to be transmitted, and provides the generated upstream data to the optical module unit.

4. The apparatus of claim 2, wherein the optical module unit receives the upstream optical signal reflected from the optical line, converts the received upstream optical signal into the reflected data of an electrical signal, and provides the converted reflected data to the comparison unit.

5. The apparatus of claim 4, wherein
    the MAC processing unit generates transmission time information regarding a point in time at which the converted upstream optical signal is transmitted to the OLT, and provides the generated transmission time information to the processor, and
    the processor analyzes a point of the optical line at which an error occurs, as the state of the optical line, based on the provided transmission time information, and reception time information regarding a point in time at which the upstream optical signal is received.

6. A method of monitoring an optical line, the method comprising:
    extracting first identification information about an optical network terminal (ONT) from reflected data that is reflected and received from the optical line, and comparing the extracted first identification information to predetermined second identification information about the ONT; and
    analyzing a state of the optical line using the reflected data when the first identification information is identical to the second identification information,
    when a plurality of pieces of the first identification information is extracted from the reflected data, extracting, from the reflected data, first data corresponding to the first identification information identical to the second identification information and analyzing the state of the optical line using the extracted first data.

7. The method of claim 6, further comprising:
    generating upstream data including the predetermined second identification information about the ONT; and
    converting the upstream data into an upstream optical signal, and transmitting the upstream optical signal to an optical line terminal (OLT) through the optical line.

8. The method of claim 7, wherein the generating comprises generating the upstream data by incorporating, into the upstream data, the predetermined second identification information about the ONT, a delimiter indicating a start of a frame of the upstream data, and raw data desired to be transmitted.

9. The method of claim 7, further comprising:
receiving the upstream optical signal reflected from the optical line, and converting the received upstream optical signal into the reflected data of an electrical signal.

10. The method of claim 9, wherein the analyzing comprises analyzing a point of the optical line at which an error occurs, as the state of the optical line, based on transmission time information regarding a point in time at which the converted upstream optical signal is transmitted to the OLT, and reception time information regarding a point in time at which the upstream optical signal is received.

\* \* \* \* \*